Nov. 5, 1957 P. FESSEL 2,811,960
ABRASIVE CUTTING BODY
Filed Feb. 26, 1957 3 Sheets-Sheet 1
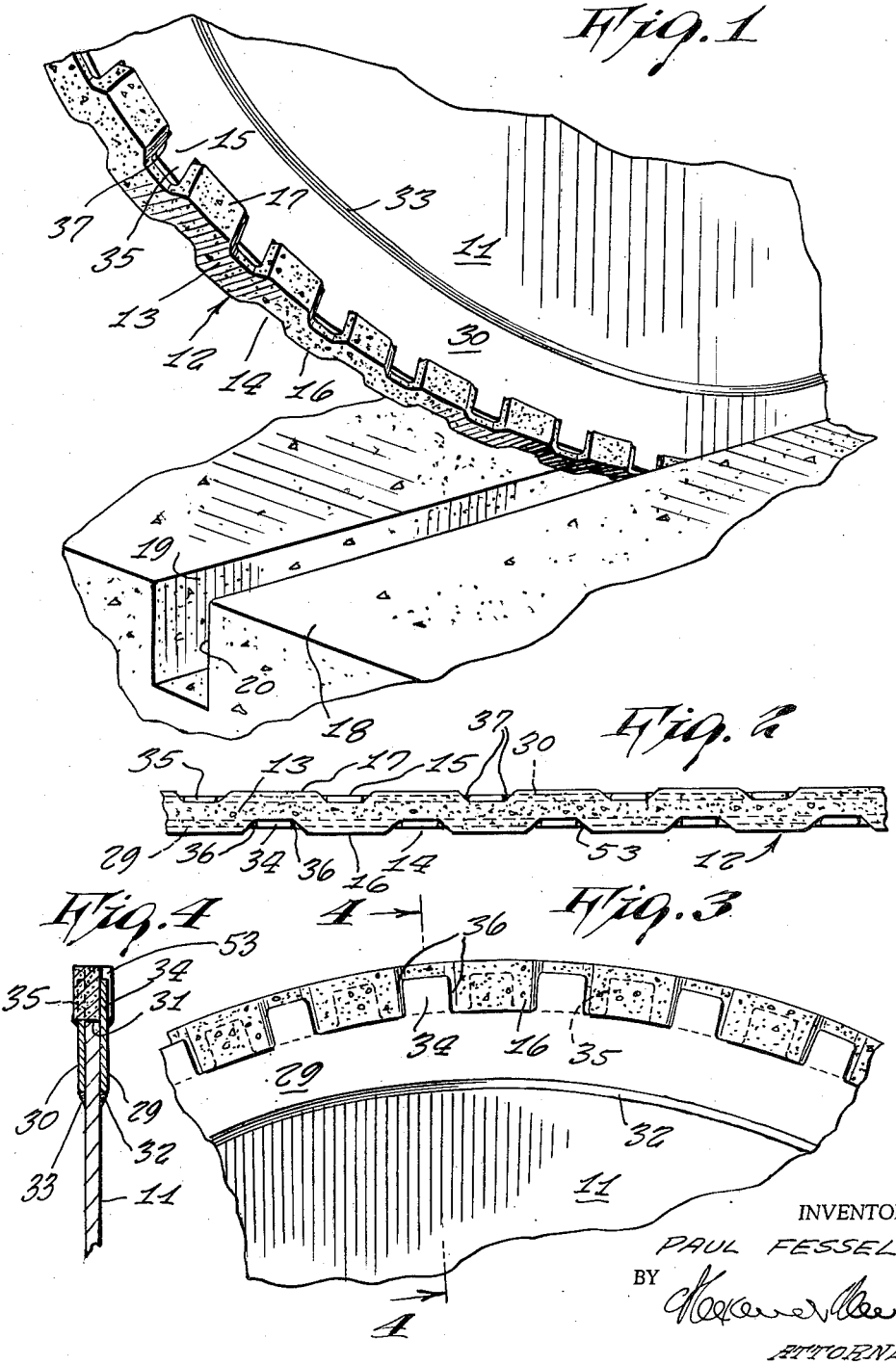
INVENTOR.
PAUL FESSEL
BY
ATTORNEY Nov. 5, 1957 P. FESSEL 2,811,960
ABRASIVE CUTTING BODY
Filed Feb. 26, 1957 3 Sheets-Sheet 2

INVENTOR.
PAUL FESSEL
BY
ATTORNEY

Nov. 5, 1957    P. FESSEL    2,811,960
ABRASIVE CUTTING BODY
Filed Feb. 26, 1957    3 Sheets-Sheet 3
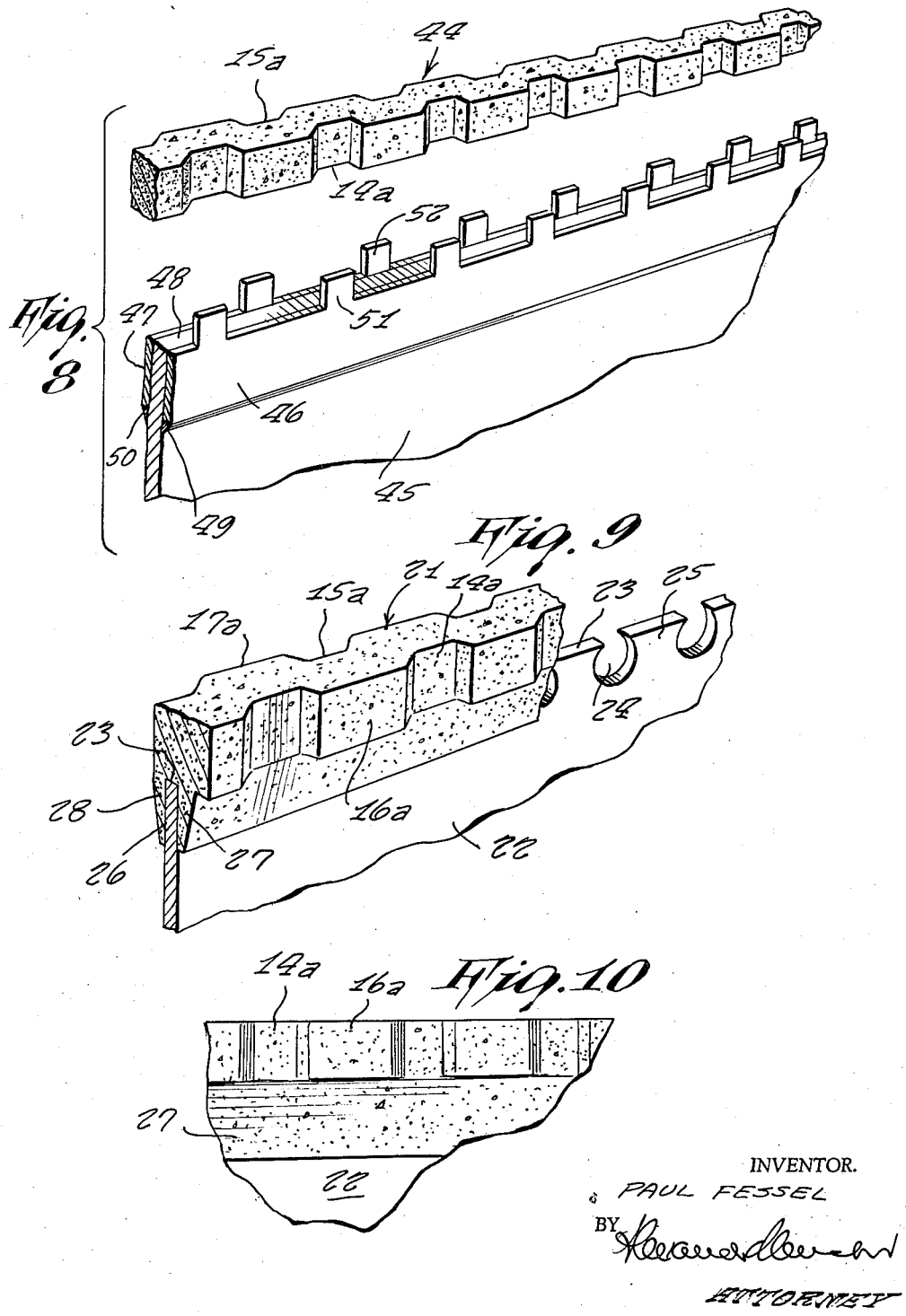
INVENTOR.
PAUL FESSEL
BY
ATTORNEY

United States Patent Office 2,811,960
Patented Nov. 5, 1957

2,811,960

ABRASIVE CUTTING BODY

Paul Fessel, Brooklyn, N. Y.

Application February 26, 1957, Serial No. 642,433

7 Claims. (Cl. 125—15)

This invention relates generally to cutting devices, but more particularly to an abrasive cutter associated with the edge or periphery of a tool for cutting stone, concrete, both cured and fresh, and other ceramic, vitreous and refractory materials.

The main object of the invention is to provide an abrading body characterized by a composition of abrasive particles bonded in, by and throughout a suitable matrix of metallic or non-metallic material, and further characterized by the body having offset grooves on opposite sides of the grinding surface.

A further object of the invention resides in the provision of an abrading body associated with reciprocally movable, rotating disc, and other types of saws and cutting apparatus wherein the cutting part is comprised of a body of the above stated composition. Such body in formation has a grinding surface and spaced grooves disposed on opposite sides, said grooves being of a depth preferably short of the longitudinal center of said grinding surface, the grooves being arranged out of line so that only a relatively small portion of the side face of the body is in frictional contact with the side walls of the groove formed in the cut body of stone or other material being severed. The grooves of the abrading body also provide spaces between the contacting side portions to provide channels for cooling, to permit the sludge or pulverized material to escape freely without adding to the frictional resistance offered the cutter and to permit water to circulate for cooling purposes if desired.

Another object of the invention is the provision of an improved saw or cutting apparatus having the abrading body and formation thereof as aforesaid as a material element of the cutting edge and further providing lateral projections so constructed and arranged that less than the full side areas of the abrading body contact the adjacent side walls of the partially severed material operated upon.

A further object of the invention is to provide an abrading body secured to and superposed on cutting and sawing tools consisting of a matrix and abrasive particles bonded by and substantially throughout said matrix and wherein the body for width of cut is provided with a minimum of cutting surface area resulting in economy of expensive abrasive particle material that may be used.

A further object of the invention resides in the provision of an abrading body composed of a compressed or molded mixture of base material including metallic alloys, metals or other materials and abrasive particles wherein there results an abrading body having a maximum unit of cutting surface obtained with a minimum unit volume of body material.

The abrading body is adapted to be applied to a shank of any type which is adapted to be driven either linearly, reciprocally, for rotation as the periphery on a disc or for rotary movement as a drill.

Other objects are to provide a cutting instrument incorporating the above mentioned abrading body which is of simple construction, which permits easy affixation to a shaft, or disc, which has a minimum number of parts, which is inexpensive to manufacture and efficient in operation.

These objects and other incidental ends and advantages of the invention will appear hereinafter in the progress of the disclosure and as pointed out in the appended claims.

Accompanying this specification are drawings showing preferred forms of the invention wherein:

Figure 1 is a fragmentary view of at least a segment of the abrading body on the periphery of a rotating disc and showing a manner of affixation thereto, the device being in process of effecting a cut groove in stone material;

Figure 2 is a top plan view of the cutting surface of the abrading body shown on the periphery of the disc in Figure 1;

Figure 3 is a view in elevation of a segmental part of the peripheral part of the device shown in Figure 1;

Figure 4 is a sectional view of Figure 3 across the plane 4—4 thereof.

Figure 8 is an exploded view in perspective showing the abrading body or a segment thereof and means of affixation to a shank for linear or reciprocable movement;

Figure 9 is an enlarged and fragmentary view in perspective showing the abrading body secured to a shank by being molded thereon;

Figure 10 is a view in elevation of Figure 9.

Figure 5:
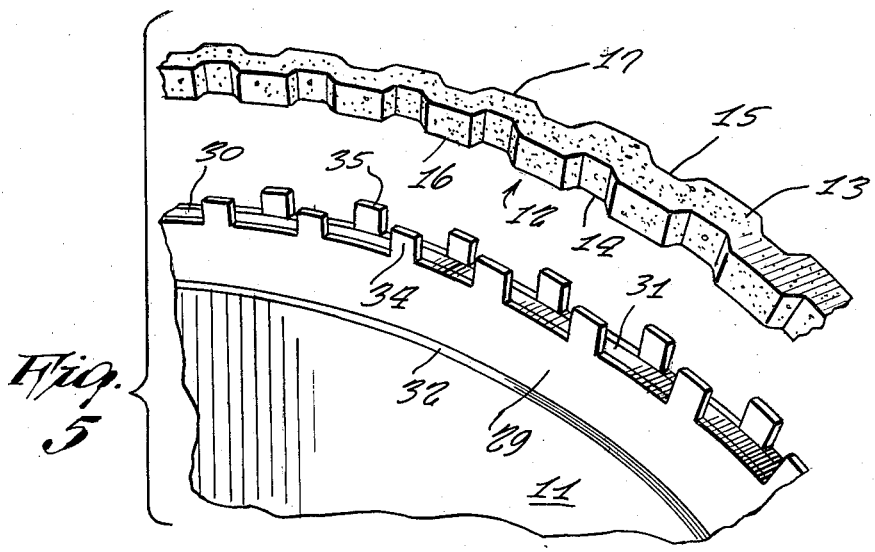
Figure 5 is a fragmentary and exploded view in perspective depicting a preferred manner of affixing the abrading body or a segment thereof to a cutting disc as by means of aligned and notched peripheral bands secured to the side faces of the disc.

In accordance with the invention and the preferred forms shown, Figures 1–5 depict one form of the invention applied to a disc type of saw. Thus, numeral 11 designates a metallic or other type of disc having mounted on the peripheral edge thereof either a continuous or one or more spaced segments of an abrading body generally indicated by numeral 12. Disc 11 is provided with a conventional central aperture not shown to provide means for mounting the saw on a shaft.

Abrading body 12 is preferably formed to offer a grinding face 13 and grooves 14 and 15 on the sides extending inwardly from the grinding face. Grooves 14 and 15 on opposite sides are arranged in staggered or out of line position and extend inwardly short of the longitudinal center of surface 13. As shown grooves 14 and 15 are radially disposed and the side faces 16 adjacent grooves 14 and the opposite side faces 17 adjacent grooves 15 are parallel determining the width of the cut.

The abrading body 12 is formed from an intimate mixture of any desired powdered matrix material and any desired abrasive particles. The matrix may be a powder of metallic alloys and metals including such materials as brass, iron, nickel, copper, silver or other substances depending upon requirements while the abrasive particles may be of diamond, tungsten, carbides, oxides or other natural or synthetic abrasive materials also depending upon requirements.

The mixture of the matrix powder and the abrasive particles are molded in a graphite mold, and heated to about 2800 degrees F. and subjected to a pressure up to 40 tons per square inch. It has been found that when diamond particles are employed, they may be in the form of a powder (16 grit down to micro sizes) so that the resultant abrading body has been 4–14 grains of diamond powder per cubic inch of abrading body.

The abrading body becomes rigid and hard after the molding and setting and possesses abrasive qualities adapted for severing the work with which it contacts.

The abrading body 12 as formed by virtue both of its composition and its grooved formation provides the advantages contemplated by the invention herein. The abrasive particles being distributed throughout the matrix are uniformly and individually encased and set throughout and do not fall out until sufficient of the matrix casing is worn down. Body 12 thus will saw faster and last longer. Moreover grooves 14 and 15 reduce normal frictional contact of full side walls of an abrading body as by the spaced side faces 16 and 17 contacting the operative subject 18 having the cut side walls 19 and 20. In addition, grooves 14 and 15 permit sludge or pulverized material to escape freely without adding to frictional resistance; further allow water to circulate through the abrading body and the stone 20, being cut. Moreover, air cooling is enhanced and the saw consequently works faster and lasts longer with the abrading body as described.

As best shown in Figure 9, an abrading body such as indicated generally by numeral 21 may be applied to a shank or disc 22 as a continuous or discontinuous rim or edge therefor by a molding operation. Thus the edge 23 of shank or disc 22 is provided with a plurality of recesses 24 preferably bounded by walls slightly converging towards the peripheral edge 23 for filling with abrasive material forming the abrading body 21 in the process of molding the abrading body rim in place. Thus, there are the molded grooved portions 14a and 15a in staggered relationship, and the spaced, parallel and staggered side faces 16a and 17a. The abrading body 21 is secured to the peripheral edge 23 and the side face areas 25 and 26 adjacent thereto as by the downwardly tapering abrading body side walls 27 and 28, anchorage being effected by the fill-up of the abrading material in recesses 24 during the molding operation. As shown the grooves 14a and 15a as well as faces 16a and 17a are vertically disposed for a straight type of abrading body, but they may also be radially disposed for a circular or arced segment of an abrading body.

Another method of affixation of an abrading body is shown in Figures 1–5 by providing a pair of similar and aligned disc face bands 29 and 30 disposed adjacent and projecting above edge 31 of disc 11, both bands being suitably attached as by welding or brazing adjacent the bottom edge thereof to the side faces of disc 11 as indicated by numerals 32 and 33. As best seen in Figure 5 the projecting outer edges of bands 29 and 30 are formed with projecting and spaced teeth indicated respectively by numerals 34 and 35, each row of said teeth being in staggered relationship with the opposite row and being adapted to enter and be against the base wall of grooves 14 and 15 of abrading body 12. Connection of said teeth in the grooves may be by brazing or welding 36 and 37. Teeth 34 and 35 may penetrate the height of grooves 14 and 15 or terminate therebelow.

Figure 6:
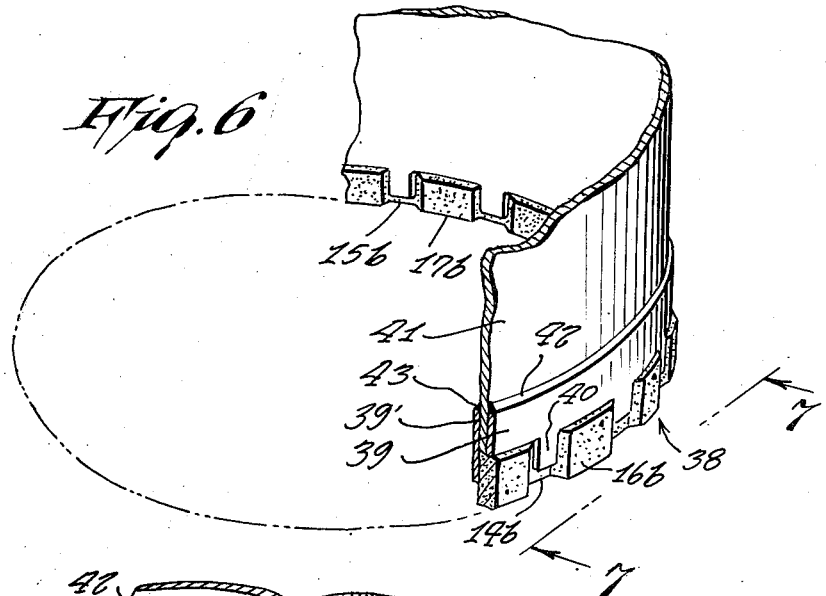
Figure 6 is a fragmentary view in elevation partly in section showing the disposition of the abrading body on a cylindrical shank.
Figure 7:
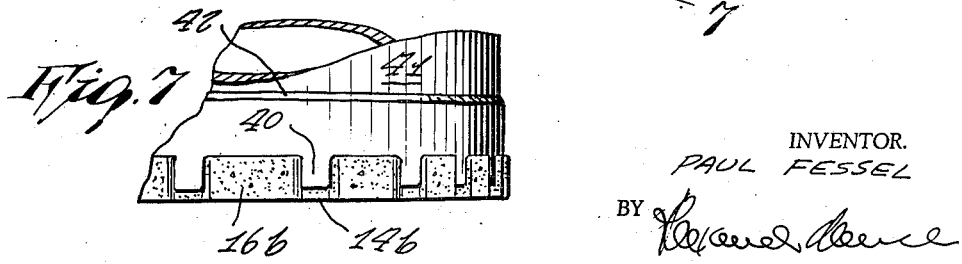
Figure 7 is a view in elevation taken from the plane 7—7 of Figure 6.

It is to be noted that while abrading body 12 as shown in Figures 1–5 is provided with a cutting surface edge 13 which forms at least a circular segment with the corrugations or grooves 14 and 15 on the side faces radially disposed, in Figures 6–7 the cutting surface is shown as being flat with the faces thereof being at least of segmental cylindrical form. Thus the abrading body generally indicated by numeral 38 has opposite and offset grooves 14b and 15b, and opposite faces 16b and 17b. Attachment to a cylindrical shank may be by molding as shown in Figure 9 or by means of disc bands as shown in Figure 5. But specifically and by reference to Figures 6 and 7, aligned disc rings 39 and 39' have depending spaced teeth 40 at the lower edge, said teeth of one ring being staggered with respect to the other ring, the rings being suitably connected to a shank such as by welding or brazing as at 42 and 43. Teeth 40 are connected in grooves 14b and 15b as described in conjunction with Figures 1–5.

In Figure 8 the straight abrading body generally indicated by numeral 44 is adapted to be mounted in a straight shank 45 having straight bands 46 and 47 mounted on the shank sides such as by brazing 49 and 50. Bands 46 and 47 have spaced teeth 51 and 52 projecting above shank edge 48 for entry into the abrading body staggered grooves 14a and 15a and there suitably secured as by brazing or welding heretofore described.

By a reference to Figure 2 it will be noted that the grooves 14 and 15 may join the outer faces 16 and 17 by diverging side walls one of which is indicated by numeral 53 which defines an included angle of approximately 45 degrees. Furthermore, the edges of cutting surface 13 may be rounded or bevelled for any required purpose.

Thus a very effective cutting edge of an abrading body is provided having a maximum cutting surface with a minimal unit volume of abrading body. In addition the abrasive particles are uniformly encased and distributed in a uniform matrix and the abrasive particle is not lost until the matrix itself is worn down whereupon more abrasive particles are exposed.

I wish it understood that minor changes and variations in the composition, shape and application of the abrading body to a shank or disc may all be resorted to without departing from the spirit of the invention and the scope of the appended claims.

I claim:

1. An abrading body adapted to be mounted on the end of a shank consisting of a uniform metallic powder matrix and abrasive particles bonded throughout by said matrix, said body having an end operative surface having offset sides throughout the length thereof so that the width of resultant cut exceeds the thickness of said body along the said surface.

2. An abrading body consisting of a uniform metallic powder matrix and abrasive particles bonded throughout by said matrix, said body having an end operative surface and sides each side being provided with equally spaced grooves in staggered relationship with the grooves of the opposite side throughout the length thereof so that the width of resultant cut exceeds the thickness of said body along the said surface and so that the grooves provide equal areas for cooling and escape of sludge material.

3. An abrading body adapted to be mounted on the end of a shank consisting of a uniform metallic powder matrix and abrasive particles bonded throughout by said matrix, said body having a curved end operative surface and straight sides provided with opposing and staggered radially disposed grooves so that the width of resultant cut exceeds the thickness of said body along the said surface.

4. An abrading body consisting of a uniform metallic powder matrix and abrasive particles bonded throughout by said matrix, said body having a curved end operative surface and curved sides provided with opposing and staggered grooves so that the width of resultant cut exceeds the thickness of said body along the said surface.

5. An abrading cutter for the peripheral edge of a cylindrical shank, said cutter being comprised of at least a segment consisting of a uniform metallic powder matrix and abrasive particles bonded throughout by said matrix, said segment having an end operative surface having offset sides so that the width of resultant cut exceeds the thickness of said body along the said surface.

6. An abrading cutter having a shank and a cutting body, at least a segment of said cutting body consisting of a uniform matrix and abrasive particles bonded throughout and by said matrix, said segment having a grinding surface and sides provided with grooves, the said shank being provided with spaced teeth along one of its edges secured to the sides of the segment at the groove portions.

7. An abrading cutter having a support provided with spaced notches along the edge thereof, a cutting body projecting above and molded on said support, said cutting body consisting of a uniform metallic powder matrix and abrasive particles bonded throughout by said matrix, said body having an end operative surface and sides provided with grooves and having a bottom engaging said support and the notches therein.

References Cited in the file of this patent

UNITED STATES PATENTS

| | | |
|---|---|---|
| Re. 21,165 | Van Der Pyl | July 25, 1939 |
| 927,164 | Puffer | July 6, 1909 |
| 2,032,395 | Bley | Mar. 3, 1936 |
| 2,270,209 | Van Der Pyl | Jan. 13, 1942 |
| 2,508,042 | Rhenberg | May 16, 1950 |
| 2,540,793 | Metzger | Feb. 6, 1951 |
| 2,633,682 | Jackson | Apr. 7, 1953 |
| 2,746,217 | Breisch | May 22, 1956 |

FOREIGN PATENTS

| | | |
|---|---|---|
| 1,422 | Great Britain | Nov. 21, 1896 |
| 829,289 | France | June 17, 1938 |